Jan. 11, 1966 C. HILLYER 3,229,036

DATA TRANSMISSION APPARATUS

Original Filed Sept. 25, 1957 5 Sheets-Sheet 1

INVENTOR
CURTIS HILLYER

BY Blair & Buckles
ATTORNEYS

INVENTOR
CURTIS HILLYER
BY Blair and Buckles
ATTORNEYS

Jan. 11, 1966 C. HILLYER 3,229,036

DATA TRANSMISSION APPARATUS

Original Filed Sept. 25, 1957 5 Sheets-Sheet 3

INVENTOR
CURTIS HILLYER

BY Blair and Buckles
ATTORNEYS

DATA TRANSMISSION APPARATUS

Original Filed Sept. 25, 1957 5 Sheets-Sheet 4

INVENTOR
CURTIS HILLYER
BY Blair and Buckles
ATTORNEYS

INVENTOR
CURTIS HILLYER
BY Blair and Buckles
ATTORNEYS 3,229,036
DATA TRANSMISSION APPARATUS Curtis Hillyer, Cranford, N.J., assignor, by mesne assignments, to Control Data Corporation, Minneapolis, Minn., a corporation of Minnesota Original application Sept. 25, 1957, Ser. No. 686,070, now Patent No. 3,059,847, dated Oct. 23, 1962. Divided and this application Oct. 30, 1961, Ser. No. 148,501
16 Claims. (Cl. 178—17)

This application is a continuation-in-part of application Serial No. 556,120 filed December 29, 1955, now U.S. Patent No. 2,918,654 issued December 22, 1959, and a division of application Serial No. 686,070 filed September 25, 1957, now U.S. Patent No. 3,059,847 issued October 23, 1962.

This invention relates to data transmission by electrical means and more particularly to a data transmitting or signal generating apparatus intended for use in a communications system including a plurality of transmitting stations and a central data receiving and recording or compiling station.

The present invention relates particularly to an apparatus for use at the transmitting stations in such a system. These transmitting stations may be used for the transmission of data concerning various type of transactions, for example in commercial or industrial establishments. In a transmitter according to the invention the data to be transmitted is set up by means of removable intelligence bearing members such as cards, strips, or the like, having on a surface thereof an array of surface irregularities, typically perforations or indentations, disposed in rows and columns. These members are inserted in fixed position into the apparatus for the transmission. Transmission is effected from these members by moving a scanning head over the array to sense the perforations or other irregularities thereof, a signal being generated at each perforation. The data for transmission may also be set up by means of controllable circuit connections to a set of electrical contacts disposed in an array of rows and columns which are also read by moving a scanning head thereover.

Control circuits are provided which effect return of the scanning head to its starting position upon the completion of a desired scanning motion and which, upon such completion, free the receiver in order to permit it to accept transmissions from other transmitters.

The invention will be further described with reference to the accompanying drawings which illustrate, in exemplary fashion, one embodiment of the invention and in which.

Figure 1:
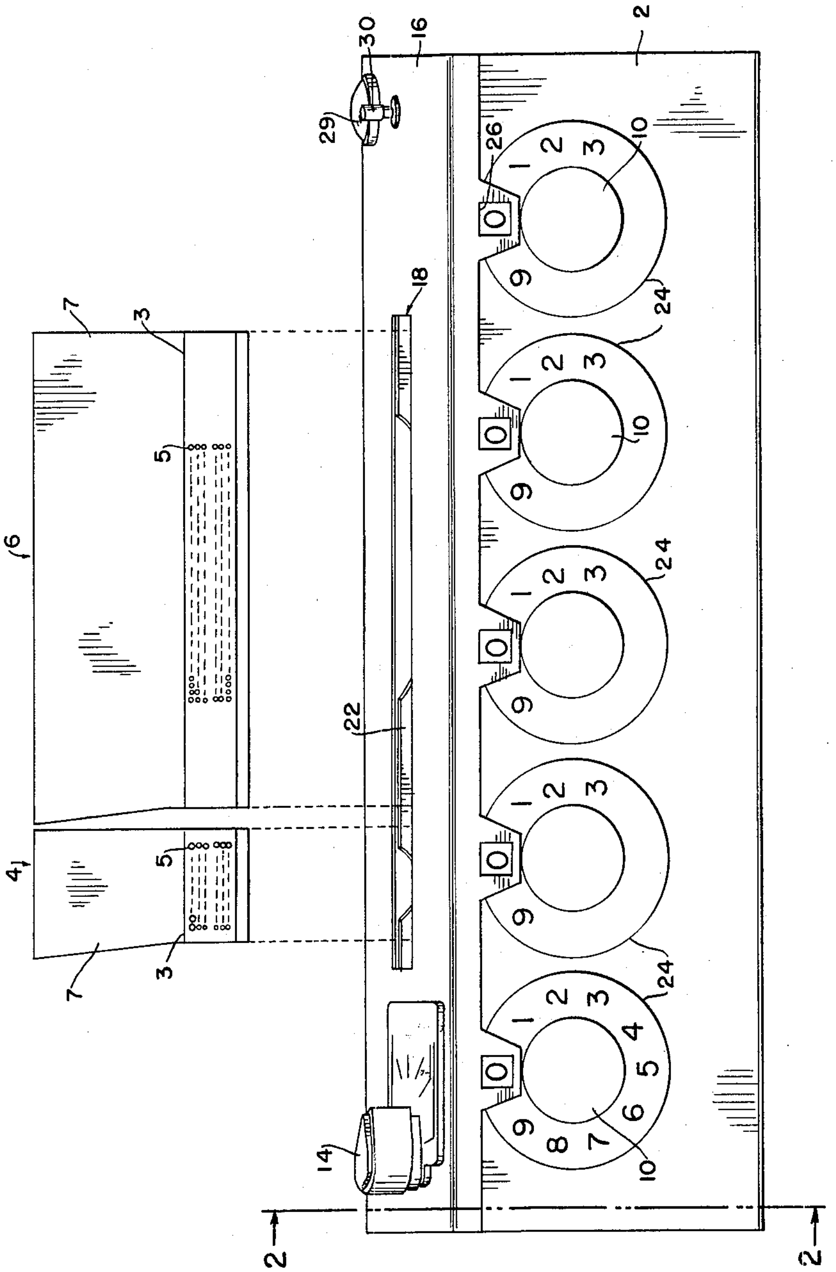
FIG. 1 is a front elevational view of one form of transmitting station or "transmitter" according to the invention, showing two data cards usable in that apparatus.
Figure 3:
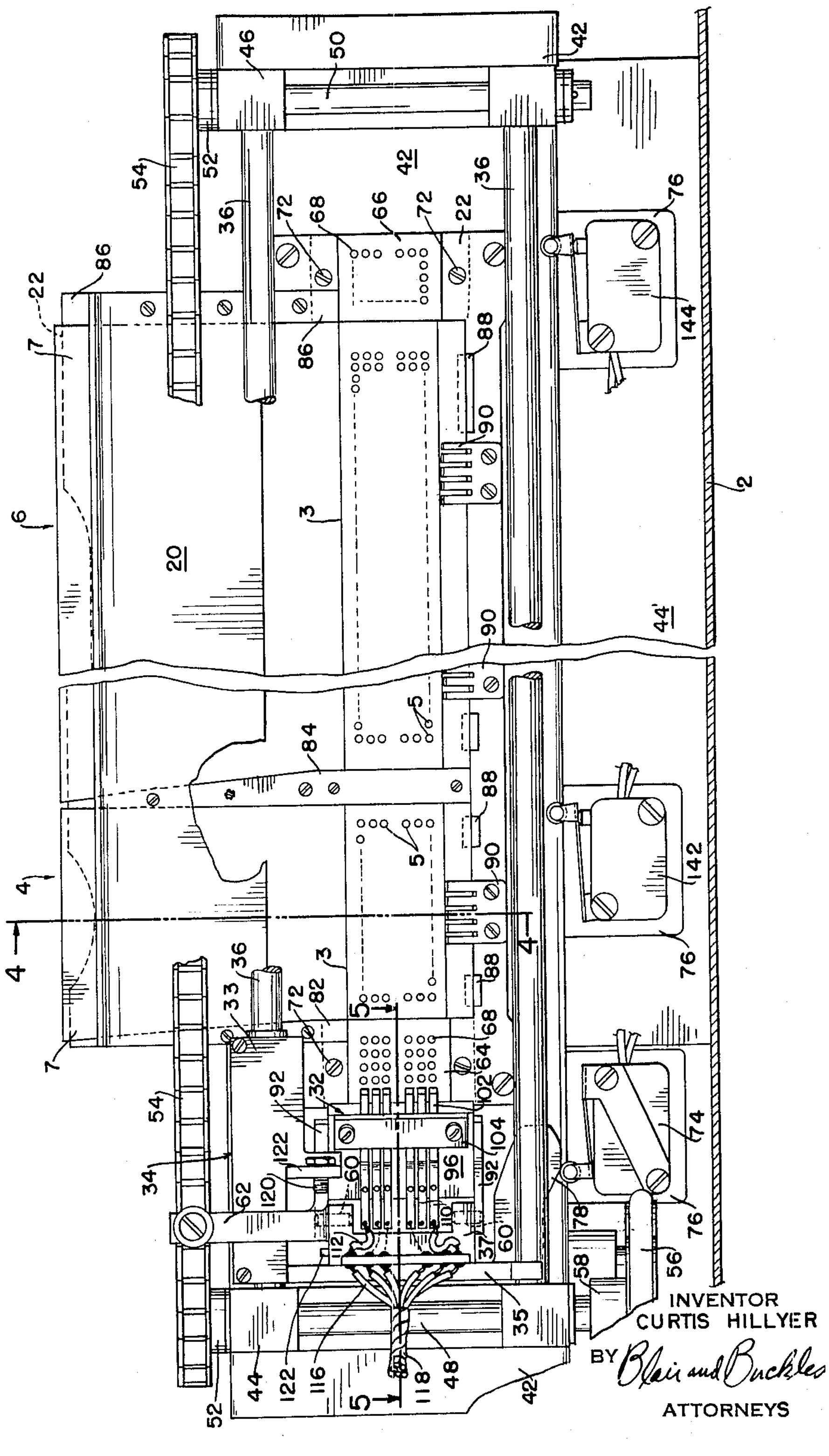
FIG. 3 is a sectional view taken on the line 3—3 of FIG. 2.
Figure 4:
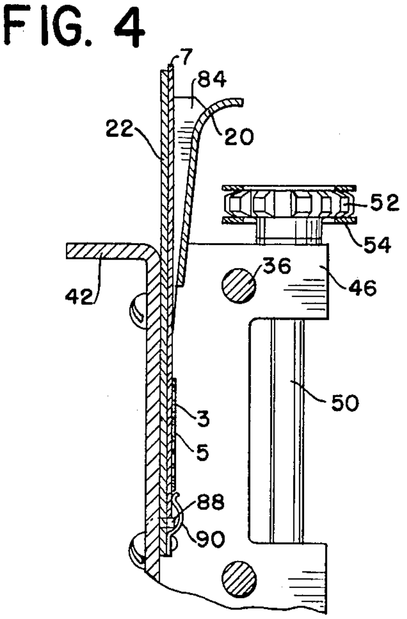
Figures 5, 6:
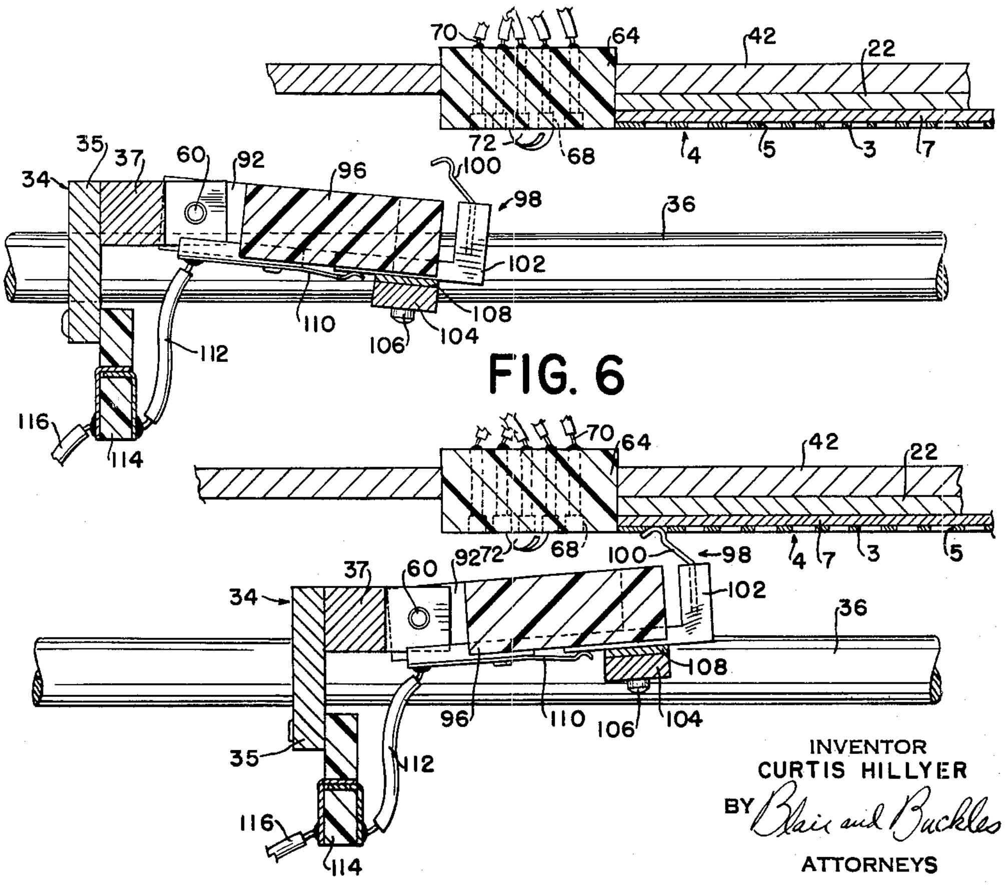
Figure 7:
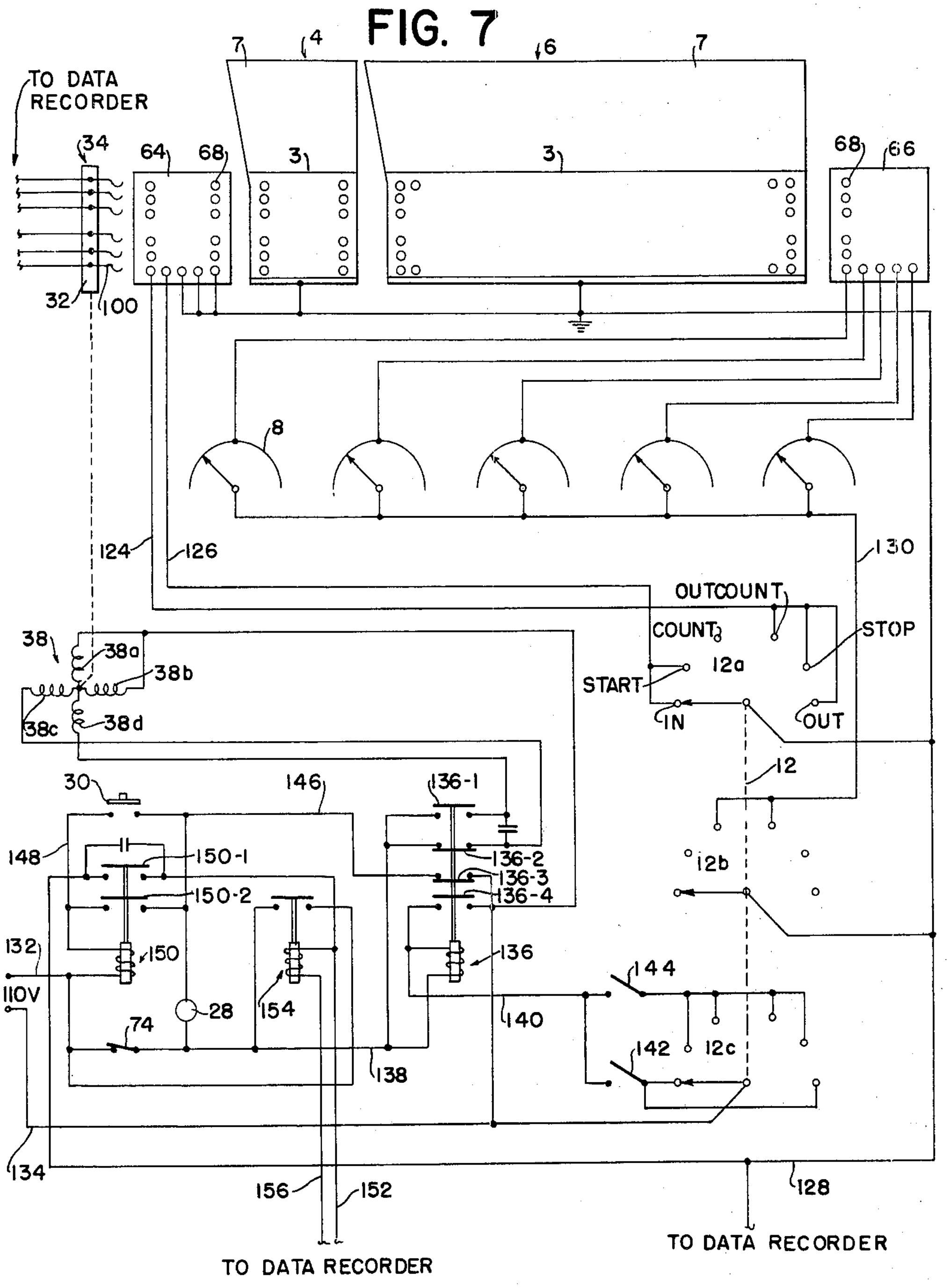

FIGS. 4 and 5 are sectional views taken on the lines 4—4 and 5—5 of FIG. 3;

FIG. 6 is a view similar to that of FIG. 5 but illustrating the relative positioning of the elements of structure shown in FIGURE 5 during data transmission; and FIG. 7 is a schematic diagram of the apparatus shown in FIG. 1.

Figure 2:
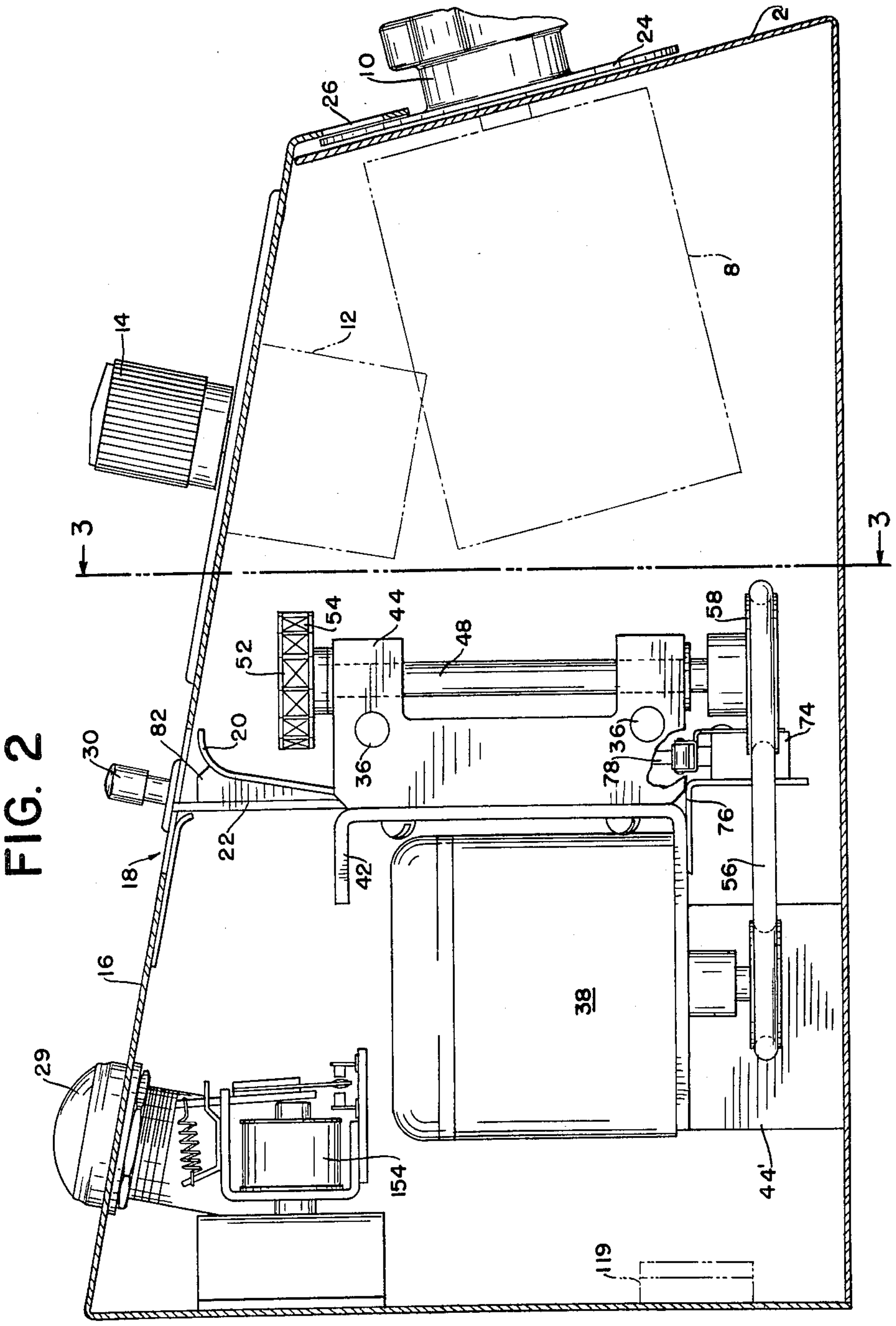
FIG. 2 is a sectional view taken on the line 2—2 of FIG. 1.

The data transmitting station or transmitter of FIG. 1 is housed in a case 2, into which data to be transmitted to the receiver may be inserted by means of one or more cards generally indicated at 4 and 6 while other data is inserted at a plurality of control knobs 10 and at another control 14. Controls 10 and 14 are coupled to switches which govern the effective presence or absence in circuit of electrical contacts disposed in two arrays of rows and columns for sensing along with the perforations or indentations on cards 4 and 6. Provision may also be made in these arrays of contacts for certain "fixed data," e.g., data identifying the transmitter, to be included in every transmission. In an exemplary use of the apparatus in an industrial plant or combination of plants for recording the progress of manufacturing operations, the cards 4 and 6 may serve respectively for identification of the worker making the report and of the machine employed by him or of the job on which he is reporting, the proper cards being selected for the transmission from a rack or the like. Other elements of data, which might for example be the number of workpieces worked upon, may be inserted into the station at a plurality of multi-position rotary switches 8 (FIG. 2) each controlled by one of the knobs 10. Control 14, as will hereinafter be more fully explained, controls the type of transmission effected, in particular the length of travel of the scanning head during the transmission, and also governs the presence or absence of certain data elements in the transmission, e.g. data indicating whether the transmission reports an addition to or a deduction from inventory or a particular class of inventory. For these purposes control 14 is coupled to a multi-position rotary switch 12 (FIG. 2).

The cover 16 of the housing is slotted at 18 to expose support means or guide members 20 and 22 (FIG. 2) between which the cars 4 and 6 may be passed for support, by means of suitable stops, in fixed position in the path of a movable scanning head 32 shown in FIG. 3. A depending portion of the cover 16 provides for each of a plurality of dials 24 coupled to knobs 10 and a window 26, at which the effective alphabetic, numeric or other coded character value of the corresponding position of the switch 8 of that dial may be read.

A signal lamp is further provided at the transmitter under a transparent window or "jewel" 29 for indicating to the operator when effective connection has been established to the receiver for the trasmission of data. In addition, a separate control is provided to initiate the data transmission operation, this control being shown in FIG. 1 as a push button switch 30.

Referring now to FIGS. 2 to 6, construction of the transmitter of FIG. 1 will be described in further detail.

Referring to FIG. 3, a scanner or scanning head generally indicated at 32 is supported on a carriage 34 which is movable lengthwise of rails 36 by operation of a motor 38. Scanner 32, in one direction of travel, namely from left to right as seen in FIG. 3, engages the stationary data bearing media and senses the same to generate signals for transmission to the receiver. In the embodiment illustrated these data bearing media are of two kinds, namely, cards 4 and 6 and two sets of contacts 68 fixed in the machine to the left and right of cards 4 and 6.

A metallic bracket 42, seen in section in FIG. 2, is supported on a block 44' from the floor of the casing 2 and may extend substantially the full length thereof. Bracket 42 supports the motor 38, the rails 36, the guide member 22 and therewith the data bearing media, and the scanner, indeed substantially all operating parts of the transmitter except the switches and controls already described and certain relays and other elements of auxiliary apparatus.

At the ends of bracket 42 there are affixed journal members 44 and 46. These support the rails 36 and also have journaled therein respectively shafts 48 and 50. Each of these carries a sprocket wheel 52. A chain 54 is passed over these wheels, and the chain is driven by a belt coupling 56 between motor 38 and a pulley 58 pinned to shaft 48. Carriage 34 includes a housing 33 which engages top rail 36 at two points spaced therealong and a vertical member 35 fixed to housing 33 and engaging the lower rail 36. It also includes a pintle-bearing member 37, fastened to member 35, on which the assembly of sensing elements of the scanner is pivoted.

Scanner 32 is mounted on carriage 34 at pivots 60, and includes an arm 62 eccentric of the axis of pivots 60 which is fastened to the sprocket chain. Motion of the chain in either direction accordingly draws carriage 34 and scanner 32 lengthwise of rails 36, but with a rotation of the scanner about the axis of pivots 60 which in travel from left to right (FIG. 3) brings the scanner into effective contact with the data bearing media of the apparatus, as shown in FIG. 6, whereas in the opposite travel the scanner is retracted from those media, as shown in FIG. 5.

The arrays of contacts 68 are mounted in two blocks 64 and 66 of insulating material affixed via guide member 22 to bracket 42 on the front side thereof, i.e., on the same side thereof as rails 36. Block 64 is disposed adjacent the left end of travel permitted to carriage 34 and block 66 is disposed adjacent the right end thereof. Each has a plurality of electrical contacts 68 terminating on its front face, these contacts being disposed in each block in a plurality of rows and columns, the horizontal rows of the two blocks being collinear. Guide member 22 and bracket 42 are cut away as indicated in FIGS. 5 and 6 for block 64, to permit connection of a conductor 70 to each of contacts 68 at the back face of these blocks.

The conductors 70 of certain of the columns of contacts 68, for example of all but the rightmost three columns on block 64, are connected to switches 8 and 12, and the condition of these switches determines which of contacts 68 are effectively in circuit for the generation of signals when they are scanned by scanner 32.

Guide member 22 is cut out at its ends to receive blocks 64 and 66 to the left and right of the positions defined thereon for cards 4 and 6 by vertical guides 82, 84 and 86 and the blocks are affixed to guide 22 by screws 72 which pass through guide 22 and enter offset portions of the blocks on the rear surface of guide 22. Bracket 42 is also apertured to receive these enlarged rear portions of blocks 64 and 66.

The front faces of blocks 64 and 66 lie in a common plane, to which rails 36 are parallel and which is parallel to the plane of guide member 22 but displaced therefrom by the thickness of cards 4 and 6.

Left and right limits of travel are established for the carriage 34 by limit switches 74 and 144 connected in the circuit of motor 38. These switches are affixed to brackets 76 depending from bracket 42 and are positioned to define, with a cam 78 on carriage 34 which actuates them upon carriage travel, left and right limits of travel for the carriage in which the sensing means on the scanner are to the left and to the right respectively of the contacts 68 on blocks 64 and 66.

Cards 4 and 6 are accurately located by means of the vertical positioning members 82, 84 and 86, by the adjacent edges of blocks 64 and 66, and by means of stops 88 and spring clips 90 which limit the downward travel of the cards between guides 20 and 22. Positioning member 84 may have at its lower portion a thickness equal to that of cards 4 and 6, extending at such thickness the height of blocks 64 and 66 between cards 4 and 6.

The cards 4 and 6 comprise each a strip 3 of insulating material, for example paper, having perforations 5 disposed therein in rows and columns. They also comprise a conducting plate 7, the strips 3 being mounted on plate 7 so that the rows of perforations in strips 3 are collinear with the rows of contacts 68 when the cards are positioned for data transmission as indicated in FIG. 3. The strips 3 and plates 7 are of such thickness that the front face of the strips 3 lie in the same plane as the front face of blocks 64 and 66. Each column of perforations in the strips 3, like each column of contacts 68, may be allocated to an alphabetic, numeric or other character in the message to be transmitted.

The columns on blocks 64 and 66 and on cards 4 and 6 are scanned successively by the scanner 32 in its motion from left to right. The scanner includes a plurality of sensing means generally indicated at 98 (FIGS. 5 and 6), one for each row of contacts 68 and of perforations 5, the strips 3 having the same number of rows of perforations 5 as blocks 64 and 66 have rows of contacts 68. The sensing means 98 sense simultaneously all perforations in a single column on cards 4 and 6 and likewise sense simultaneously all contacts in a single column on blocks 64 and 66. A yoke 92 (FIG. 3) is pivoted at 60 to a member 37 fixed in carriage 34, and arm 62 is fastened to yoke 92. A board 96 of insulating material is fastened to yoke 92 and supports the sensing means, which in the embodiment illustrated comprise contact brushes 100 (FIGS. 5 and 6).

Each of these brushes is fastened into a metallic holder 102. The holders are held between board 96 and a clamp 104 which is drawn against the board 96 by screws 106 and which has a sheet 108 of resilient insulating material adjacent the holders.

Each of holders 102 is engaged by a contact finger 110 secured to board 96, and connected by a short lead 112 to a terminal board 114 affixed to carriage member 35. Leads 116, one for each of brushes 100, are there combined into a flexible cable 118 which leads to a terminal board 119 (FIG. 2). A cable from this terminal board connects the transmitter to the remote data receiving equipment.

An adjustable stop 120 on an arm 122 fixed on the carriage 34 may be provided to limit the rotation undergone by arm 62 and yoke 92 when the carriage is drawn to the right by chain 54, in order to limit the stress engaging brushes 100 with the data bearing members. A stop pin 122 may also be provided on carriage member 37 for engagement with arm 62 to limit the opposite rotation of yoke 92 when chain 54 draws the carriage to the left. The two positions of yoke 92 are seen in FIGS. 6 and 5, which are respectively those of engagement and disengagement of the sensing means 98 with the stationary data bearing members.

The brushes 100 possess resiliency such that, when the scanner is engaged with either of the data bearing cards 4 and 6 as indicated in FIG. 6 each brush will, upon encountering a perforation 5, move its end remote from holder 102 through the thickness of the strip 3 of the card, as also shown in FIG. 6, despite the possible absence of perforations in adjacent rows for the column in question. Brushes 100 thus sense the perforations 5 in the strips 3 by flexing through the thickness of the strip to complete electrical circuits for the conductors 116 of cable 118 upon contacting the conducting plates 7 of cards 4 and 6 through the perforations. These are in contact with guide member 22 and hence, in the embodiment illustrated, with the case 2. They are thereby held at a fixed or "ground" potential existing throughout the system of transmitters and receiver, as are those of contacts 68 in blocks 64 and 66 which are placed effectively "in circuit" by switches 8 and 12. In those columns of blocks 64 whose contacts are not connected to any of those switches, the contacts employed to provide coded characters identifying the transmitter are also at this potential and are hence "in circuit." The contacts of blocks 64 and 66 are sensed by brushes 100 upon contact therewith, such contact being effective to complete circuits for the conductors 116 of cable 118.

The operation of the transmitter may now be explained with reference to FIG. 7 in which blocks 64 and 66 and cards 4 and 6 are shown, with diagrammatic indications of the connections thereto.

In each of the first and second columns of block 64, reading from the left, a single conductor connects to a coded combination of the contacts 68 of such column. These conductors 124 and 126 lead to selected ones of the stationary contacts on one deck 12*a* of the multiple deck rotary switch 12. In FIG. 7 the connection is to the fourth to sixth stationary contacts for conductor 124 and to the first and second for conductor 126, counting clockwise in FIG. 7. For simplicity, both switch 12 and the single one of switches 8 visible in FIG. 2 are shown in that figure by means of a conventional rectangle only. Switches 8 and 12 are, however, all of the multiple deck rotary type having a plurality of contacts in each deck. In each of these columns, and indeed in all columns of block 64, contacts may be provided in any combination of number and positioning among the rows, in order to provide a coded character for such column. Advantageously, however, all columns of contacts are complete in both of blocks 64 and 66, and the desired encoding of alphabetical, numerical or other characters is obtained in the case of block 64 simply by open-circuiting contacts for each column in the rows where no signal is desired in order to obtain the combination of signals which represents the desired character.

In the embodiment illustrated, the two left-most columns in block 64 are employed for the generation of what may be termed "mode" signals characterizing the general nature of the message. Selection among these two columns for their inclusion in the transmission is made at switch 12 which may be termed a "mode" switch. For example, the left hand column may be used for an "OUT" character, referring to a withdrawal from inventory, so that when switch 12 is in any of its fourth to sixth positions the "OUT" character contacts of the left hand column on block 64 will be placed effectively in circuit by their connection through switch 12 to a system ground conductor 128. Passage of the scanner 32 over that column from left to right will complete a circuit on the system ground through conductor 124 and conductors 116 of cable 118 for each row of that column "containing" a contact, i.e., for each row to whose contact in that column conductor 124 is connected. The completion of these circuits effects the generation of signals in the receiver, not shown, to which cable 118 leads.

Similarly, the next to left hand column in block 64 may be used for an "IN" character representing an addition to inventory. The "IN" and "OUT" characters are the same in all transmitters connected to one receiver. The other three columns in block 64 may be employed for a three character number or symbol identifying the particular transmitter and peculiar to it. The contacts in these three columns appropriate to the characters encoded thereby respectively may be permanently grounded, to effect transmission of a tranmitter identifying symbol on every scan. Plates 7 of cards 4 and 6 are shown in FIG. 7 connected to ground to indicate their electrical continuity with conductor 128.

All contacts 68 of each column in block 66 are connected to a distinct one of the switches 8, the connection being shown symbolically in FIG. 7. The connection comprises, however, a separate conductor for each contact in each column so that all contacts in a given column are connected to a single one of the switches 8, block 66 including contacts in all rows of all columns thereof. The various positions of the associated switches 8 connect various combinations of the contacts of such columns to a conductor 130 which leads to the third and fourth stationary contacts at a second deck 12*b* of switch 12. For example, ten such combinations may be provided to permit setting up of any one of the digits from 0 to 9 at each of switches 8. It will be seen that when switch 12 (whose contact arms move together in all decks thereof) is in either its third or fourth position, signals will be generated in conductor 116 of cable 118 on scanning of block 66.

Likewise, on scanning of the cards 4 and 6, each column of perforations on the cards will give rise to a pulse on a particular combination among the wires of cable 118 which will be perceived as an alphabetical, numerical or other character at the receiver.

Motor 38 is shown coupled to carriage 34, and is energizable for rotation in either direction through a combination of relays and switches which will now be described.

Power for the motor and for lamp 28 (under jewel 29 of FIG. 1) is applied to conductors 132 and 134 from an appropriate source, which may for example be a 110 volt A.C. lighting circuit. Conductor 134 is permanently connected to two of the motor coils 38*a* and 38*b*. Of the other two, one coil 38*c* for "forward" travel, i.e., travel of the carriage from left to right in FIG. 3, in the direction which engages brushes 100 with the data bearing elements, is connected through normally closed contacts 136–2 of a relay generally indicated at 136 to a conductor 138 and thence to conductor 132 through limit switch 74 (FIG. 3) the contacts of which are closed except when the carriage is at the left end of its travel. It is indeed the position of switch 74 which, by opening the motor circuit, brings the motor to a halt and defines the left end of the carriage travel.

The fourth motor winding 38*d* for reverse rotation to move the carriage from right to left connects to conductor 138 through normally open contacts 136–1 of relay 136.

The actuating coil of relay 136 is connected between conductor 138 and a conductor 140, which leads through normally open locking contacts 136–4 of the relay to conductor 134. Conductor 140 also leads to each of two motion limiting switches 142 and 144 disposed (FIG. 3) like switch 74 along rails 36 in the path of cam 78 on carriage 34. Like switch 74, switches 142 and 144 are open except when carriage 34 is to the right of them respectively.

Switch 142 is positioned to be actuated (closed) when the scanner has scanned block 64 and card 4, completing what may be termed a "short scan." Switch 144 is positioned to be actuated (closed) when the scanner has in addition scanned card 6 and block 66, completing a "full scan."

Switch 144 leads to the second through fifth stationary contacts of a third deck 12*c* of switch 12, whereas switch 142 leads to the first and sixth of those stationary contacts, the rotating arm of deck 12*c* connecting to conductor 134 while the rotating arms of decks 12*a* and 12*b* lead to the system ground 128.

Relay 136 further includes a pair of normally closed contacts 136–3 connecting conductor 134 to a conductor 146. Conductor 146 is connectible, through a normally open spring loaded push button switch 30, with a conductor 148 connecting to the end of the actuating coil of a relay 150 opposite conductor 132. Relay 150 is provided with normally open contacts 150–1 between ground conductor 128 and a conductor 152 leading to the receiving apparatus (not shown), and also with normally open contacts 150–2 between conductor 148 and conductor 146. Lamp 28 is connected between conductors 146 and 138.

The operation of the unit is as follows. At the receiver there is provided a stepping switch. The conductors 152 of all transmitters connected to the receiver connect to the stationary contacts of a first bank of this receiver stepping switch, and, through individual unidirectional conducting devices, to the actuating coil of that stepping switch. The conductors 156 of all transmitters connect to the stationary contacts of a second bank of that stepping switch in the receiver. This stepping switch has other banks in a number equal to the number of brushes 100 on the transmitters, and in each of its positions this stepping switch at the receiver engages at such other banks the conductors of all brushes 100 of the transmitter whose conductors 152 and 156 are engaged in that position at the first two banks mentioned. The contact arms of such other banks in the receiver stepping switch lead in the receiver to electronic storage apparatus and thence, typically, to a synchronous punch for the recording of the received data, as is set forth in my copending application Serial No. 556,120, now Patent No. 2,918,654 issued December 22, 1959, above referred to.

When it is desired to transmit a message from a transmitter such as that illustrated in the present application to receiving apparatus of the type above indicated, a data card 4 or data cards 4 and 6 are inserted into the transmitter and the type of transmission to be made is selected at the "mode" switch 12. In the system of copending application Serial No. 556,120, now Patent No. 2,918,654 issued December 22, 1959, the six positions of switch 12 are identified as IN, START, COUNT, OUT COUNT, STOP, and OUT respectively, moving clockwise in FIG. 7. These six types or "modes" of transmission are characterized by a short or full scan, by transmission or non-transmission of the "OUT" code character of the first or left-most column in block 64, of the "IN" code character in the second column of block 64, and of the data on card 6 and block 66, according to the following table wherein an X indicates transmission of the character or set of data identified at the head of the column in which it is found.

| Mode | In Character | Out Character | Scan | Card 4 | Card 6 | Block 66 |
|---|---|---|---|---|---|---|
| IN | X | -------- | Short | X | -------- | -------- |
| START | X | -------- | Full | X | X | -------- |
| COUNT | -------- | -------- | Full | X | X | X |
| OUT COUNT | -------- | X | Full | X | X | X |
| STOP | -------- | X | Full | X | X | -------- |
| OUT | -------- | X | Short | X | -------- | -------- |

In all modes there is transmitted the transmitter identification data encoded in the third, fourth and fifth columns of block 64. Modes "IN" and "OUT" involve a short scan covering block 64 and card 4 only, travel of the carriage being reversed when it reaches the position of switch 142. In all other modes the carriage scans cards 6 and block 66 as well, its travel being not reversed until the carriage reaches the position of switch 144.

The card or cards having been inserted and the desired mode of transmission having been selected, the transmission is initiated by momentary closing of switch 30. While the actual transmission of data does not in general begin immediately, it follows automatically from the closing of this switch. Let it be assumed that switch 12 is in the "COUNT" position.

Relays 136, 150 and 154 are initially de-energized. Closing of switch 30 energizes relay 150 through closed contacts 136–3. Relay 150 now locks itself in energized condition at its contacts 150–2 in parallel with switch 30. Closing of contacts 150–1 applies the system ground to conductor 152. Grounding of conductor 152 sets into operation the stepping switch at the receiver above referred to. The receiver stepping switch steps around until the contact arm of its first bank engages the contact of conductor 152 in the transmitter whose switch 30 has been closed. This produces energization of a relay at the receiver which disables the stepping switch. With the stepping switch at the receiver thus arrested, various other functions preliminary to the transmission of data from the transmitter of FIG. 7 may be effected as disclosed in my said copending application Serial No. 556,120, now Patent No. 2,918,654 issued December 22, 1959. Thus a time signal may be generated and applied to conductors which lead to the contact arms of the banks in the receiver stepping switch which are now connected via cable 118 to the brushes of scanner 32 in FIG. 7, for the transmitter about to transmit.

Upon the completion of these preliminary operations at the receiver, a positive voltage is applied to the contact arm of the second bank of contacts in the receiver stepping switch so that a positive voltage appears on conductor 156 in the transmitter of FIG. 7. This causes energization of relay 154, and the closing of its contacts short-circuits together conductors 132 and 138, completing the circuit for motor 38. As soon as motor 38 has driven carriage 34 to the right of its limit position switch 74 closes and the motor circuit is made complete irrespective of the energized condition of relay 154.

Lamp 28 is illuminated as soon as relay 154 energizes, advising the operator of the transmitter that the transmission is in progress and that data cards 4 and 6 should not be removed from the slot 18 in which they are received until lamp 28 goes out.

With switch 12 in the "COUNT" position, limit switch 142 is rendered ineffective and the carriage effects a full scan, drawing brushes 100 all the way to the right end of block 66 at which point limit switch 144 is closed by cam 78 on the carriage.

Closure of switch 144 energizes relay 136. Relay 136 then locks itself at its contacts 136–4 but the opening of its contacts 136–3 de-energize relay 150. This turns off the lamp 28 and also disconnects conductor 152 from ground conductor 128. The energizing circuit for motor 38 is opened at contacts 136–2 but is reestablished at contacts 136–1 for the reverse direction winding 38*d*. Consequently, travel of the carriage is reversed and it is shifted to the left end of rails 30 (FIG. 3) until the circuit for motor 38 is interrupted by opening of switch 74.

During such travel from right to left the sensing means of the scanner are withdrawn from engagement with the data bearing members so that no signals are generated during such travel.

The relays 136, 150 and 154 may be mounted in any convenient place within the apparatus of FIGS. 1 to 6, one of them being seen in the side elevation view of FIG. 2.

While the invention has been described in terms of a preferred embodiment, the invention itself is not limited to the details of this embodiment, but is on the contrary suspectible of various modifications within the scope of the appended claims. In particular, the invention is in no wise limited by the significations which have been suggested herein for the various data bearing members and for the particular columns thereof which have been mentioned.

I claim:

1. A data communication transmitter, comprising in combination, means for storing at least one transmitter identifying information character, a plurality of means each adapted to accept only one information character bearing punch coded card, manually operable means for individually selecting variable information characters prior to each transmission from the transmitter, and means for sequentially transmitting successively the punch coded information characters borne on punch coded cards in said card accepting means together with the selectively introduced variable information characters and said transmitter identifying information characters, the units of each character of said transmission being transmitted simultaneously.

2. A data communication transmitter, comprising in combination, means for storing at least one transmitter identifying information character, a plurality of receiving means each adapted to receive only one of predetermined size and configuration card information character bearing, means for selectively introducing each of a plurality of individual variable information characters into said transmitter prior to each transmission therefrom, and means for sequentially transmitting the punch coded information characters borne on cards in said card receiving means together with the selectively introduced variable information characters and the transmitter identifying information characters.

3. A data communication transmitter, comprising in combination, means for storing transmitter identifying information, a plurality of means each adapted to accept only one punch coded card, means for selectively introducing variable information into said transmitter prior to each transmission therefrom, manually operable means for selecting a mode of transmission, means for sequentially transmitting the characters of the punch coded information of said punch coded cards together with the preselected characters of said introduced variable information and said transmitter identifying information, and means responsive to said manually operable means controlling said transmitting means to suppress the transmission of a selected plurality of said characters.

4. The combination of claim 3 further defined in that said means responsive to said manually operable means also causes the transmission in sequence with said characters of at least one preselected mode character.

5. A data communication transmitter, comprising in combination, a plurality of means each adapted to accept only one information character bearing punch coded card, manually operable means for individually introducing at least one selectable variable information character into said transmitter prior to each transmission therefrom, and means for sequentially transmitting the punch coded information characters on the punch coded cards together with the introduced variable information characters.

6. A data communication transmitter, comprising in combination, a plurality of means each adapted to accept only one punch coded card, manually operable means for introducing preselected variable information into said transmitter prior to each transmission therefrom, and means for sequentially transmitting the characters of the punch coded information on said punch coded cards together with the characters of said introduced variable information, said transmitting means being responsive to said manually operable means to suppress the transmission of a selected plurality of said characters.

7. A data communication transmitter, comprising in combination, means for storing transmitter identifying information, means for accepting at least one coded information bearing member, manually operable means for introducing selected information character by character into said transmitter prior to each transmission therefrom, and means for sequentially transmitting the characters borne on said information bearing member together with the characters of said preselected introduced information and said transmitter identifying information, said sequential transmitting means being responsive to said manually operable means to suppress the transmission of a selected plurality of said characters.

8. A data communication transmitter, comprising in combination: a plurality of data card receiving means each adapted to receive only one data card; a plurality of manually actuatable data character selecting means; transmission mode selecting means; means for transmitting from said data communication transmitter the data characters recorded on data cards in said data card receiving means and the characters selected by manual actuation of said data character selecting means; said transmitting means being responsive to said transmission mode selecting means to suppress transmission of characters recorded on a card inserted in one of said data card receiving means when certain transmission modes are selected; and said transmitting means being further responsive to said transmission mode selecting means to transmit a mode character corresponding to the transmission mode selected.

9. A data communication transmitter, comprising in combination: a plurality of data card receiving means each adapted to receive only one data card; a plurality of manually actuatable data character selecting means; transmission mode selecting means; means for transmitting from said data communication transmitter the data characters recorded on data cards in said data card receiving means and the characters selected by manual actuation of said data character selecting means; said transmission means being responsive to said transmission mode selecting means to suppress transmission of character selected by said data character selecting means when certain transmission modes are selected; and said transmitting means being further responsive to said transmission mode selecting means to transmit a mode character corresponding to the transmission mode selected.

10. A data communication transmitter, comprising in combination: a plurality of data card receiving means each adapted to receive only one data card; a plurality of manually actuatable data character selecting means; transmission mode selecting means; means for transmitting from said data communication transmitter the data characters recorded on data cards in said data card receiving means and the characters selected by manual actuation of said data character selecting means; said transmitting means being responsive to said transmission mode selecting means to suppress transmission of characters selected by said data character selecting means when certain transmission modes are selected, and to suppress transmission of characters recorded on a card inserted in one of said data card receiving means when certain transmission modes are selected; and said transmitting means being further responsive to said transmission mode selecting means to transmit a mode character corresponding to the transmission mode selected.

11. The data communication transmitter defined in claim 10 and manually actuatable means for initiating operation of said transmitting means.

12. The combination defined in claim 10 wherein at least one of said plurality of data card receiving means is adapted to receive a data card of only one predetermined size and configuration.

13. A data communication transmitter, comprising in combination: a plurality of data card receiving means differing in size and configuration from each other and each adapted to receive a single data card of predetermined size and configuration; a plurality of data character selecting means manually settable by rotation thereof; manually operable transmission mode selecting means; manually operable transmission initiating means; and transmitting means responsive to manual operation of said transmission initiating means for transmitting from said data communication transmitter the data characters recorded on data cards in said data card receiving means and the characters selected by manual setting of said data character selecting means; said transmitting means also being responsive to said manually operable transmission mode selecting means to suppress transmission of characters selected by said data character selecting means when certain transmission modes are selected, and to suppress transmission of characters recorded on a card received in one of said data card receiving means when certain transmission modes are selected; and said transmitting means being further responsive to said transmission mode selecting means to transmit a mode character corresponding to the transmission mode selected.

14. A data communication transmitter, comprising in combination, means for storing transmitter identifying information, a plurality of means each adapted to accept only one punch coded card, manually operable means for introducing selected variable information into said transmitter prior to each transmission therefrom, means for sequentially transmitting successively the characters of the punch coded information on punch coded cards in said card accepting means together with the characters of said selectively introduced variable information and said transmitter identifying information, the units of each character of said transmission being transmitted simultaneously, and further means for selecting differing modes of transmission wherein only a selected plurality of said characters are transmitted.

15. The combination of claim 14 further defined in that said further means controls the transmission of one or more selected mode characters corresponding to the mode selected, all of said characters including said mode characters being transmitted in sequence.

16. A data communication transmitter, comprising in combination, a plurality of means each adapted to accept only one information character bearing punch coded card, a plurality of manually operable means each individually operable to introduce one selectable variable information character into said transmitter prior to each transmission therefrom, and means for sequentially transmitting the punch coded information characters on the punch coded cards together with the introduced variable information characters.

References Cited by the Examiner

UNITED STATES PATENTS

| | | | |
|---|---|---|---|
| 1,927,556 | 9/1933 | Nelson | 178—2 |
| 2,129,743 | 9/1938 | Nelson | 340—147 |
| 2,690,474 | 9/1954 | Edgar | 179—17.5 |
| 2,858,888 | 11/1958 | McGayhay et al. | 178—17.5 |
| 3,014,093 | 12/1961 | Zenner | 178—17.5 |

NEIL C. READ, *Primary Examiner.*

ROBERT H. ROSE, *Examiner.*

UNITED STATES PATENT OFFICE
CERTIFICATE OF CORRECTION

Patent No. 3,229,036 January 11, 1966

Curtis Hillyer

It is hereby certified that error appears in the above numbered patent requiring correction and that the said Letters Patent should read as corrected below.

Column 2, line 31, for "cars" read -- cards --; column 3, line 74, for "lie" read -- lies --; column 4, line 56, after "These" insert -- plates --; line 63, for "blocks" read -- block --; column 8, lines 62 and 63, strike out "of predetermined size and configuration card"; line 64, after "ing" insert -- card of predetermined size and configuration --.

Signed and sealed this 10th day of January 1967.

(SEAL)
Attest:

ERNEST W. SWIDER
Attesting Officer

EDWARD J. BRENNER
Commissioner of Patents